(12) United States Patent
Son et al.

(10) Patent No.: US 9,413,009 B2
(45) Date of Patent: Aug. 9, 2016

(54) BINDER COMPOSITION FOR RECHARGEABLE LITHIUM BATTERY, AND ELECTRODE AND RECHARGEABLE LITHIUM BATTERY INCLUDING THE SAME

(75) Inventors: Dong-Ho Son, Yongin-si (KR); Ki-Jun Kim, Yongin-si (KR); Ihn Kim, Yongin-si (KR); Chae-Woong Cho, Yongin-si (KR); Myoung-Sun Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 172 days.

(21) Appl. No.: 13/039,888

(22) Filed: Mar. 3, 2011

(65) Prior Publication Data

US 2012/0070737 A1 Mar. 22, 2012

(30) Foreign Application Priority Data

Sep. 17, 2010 (KR) ........................ 10-2010-0092020

(51) Int. Cl.
*H01M 4/62* (2006.01)
*C08F 16/06* (2006.01)
*C08F 8/14* (2006.01)
*C08F 8/44* (2006.01)
(Continued)

(52) U.S. Cl.
CPC ................. *H01M 4/621* (2013.01); *C08F 8/14* (2013.01); *C08F 8/44* (2013.01); *H01M 4/134* (2013.01); *H01M 4/386* (2013.01); *H01M 4/387* (2013.01); *H01M 4/622* (2013.01); *H01M 10/0525* (2013.01); *C08F 2810/20* (2013.01); *Y02E 60/122* (2013.01); *Y02P 70/54* (2015.11)

(58) Field of Classification Search
USPC .................................................. 429/217, 212
See application file for complete search history.

(56) References Cited

U.S. PATENT DOCUMENTS 5,888,666 A 3/1999 Kawakami
6,656,633 B2 * 12/2003 Yamakawa et al. ........... 429/217
(Continued)

FOREIGN PATENT DOCUMENTS

CN 1687276 A 10/2005
CN 101447561 A 6/2009
(Continued)

OTHER PUBLICATIONS

Gudeman et al., "Preparation and Characterization of pH-Sensitive, Interpenetrating Networks of Poly(vinyl alcohol) and Poly(acrylic acid)", Journal of Applied Polymer Science, vol. 55, Issue 6, Mar. 10, 2003, pp. 919-928.*

(Continued)

*Primary Examiner* — Ula C Ruddock
*Assistant Examiner* — Osei Amponsah
(74) *Attorney, Agent, or Firm* — Robert E. Bushnell, Esq.

(57) ABSTRACT

Disclosed are a binder composition for a rechargeable lithium battery including a cross-linked compound of polyacrylic acid substituted with an alkali cation and polyvinyl alcohol and an electrode and rechargeable lithium battery including the same. The cross-linked compound of polyacrylic acid and polyvinyl alcohol is obtained by heating polyacrylic acid and polyvinyl alcohol to effect a cross-linking reaction via esterification. The cross-linked compound of polyvinyl alcohol and polyacrylic acid substituted with an alkali cation may improve phase stability of a binder, and has high cross-linking ratio, thereby providing for excellent performance of a rechargeable lithium battery.

16 Claims, 5 Drawing Sheets

(51) Int. Cl.
*H01M 4/134* (2010.01)
*H01M 10/0525* (2010.01)
*H01M 4/38* (2006.01)

(56) References Cited

U.S. PATENT DOCUMENTS

| | | | |
|---|---|---|---|
| 7,931,984 | B2 | 4/2011 | Choi et al. |
| 2007/0283808 | A1 | 12/2007 | Chung et al. |
| 2008/0038639 | A1* | 2/2008 | Ohata et al. ............. 429/231.95 |
| 2008/0044733 | A1* | 2/2008 | Ohata et al. ................... 429/326 |
| 2009/0136845 | A1* | 5/2009 | Choi .................... H01M 4/0404 429/212 |
| 2009/0325069 | A1* | 12/2009 | Anada et al. .................. 429/217 |
| 2010/0047693 | A1 | 2/2010 | Yang et al. |

FOREIGN PATENT DOCUMENTS

| | | |
|---|---|---|
| EP | 2068384 A1 | 6/2009 |
| EP | 2071651 A1 | 6/2009 |
| JP | 06-163050 | 6/1994 |
| JP | 08-007896 A | 1/1996 |
| JP | 11-067215 A | 3/1999 |
| JP | 2000-251924 | 9/2000 |
| JP | 2000-348730 A | 12/2000 |
| JP | 2001-283859 A | 10/2001 |
| JP | 2004-134365 A | 4/2004 |
| JP | 2005-294179 | 10/2005 |
| JP | 2009-026760 A | 2/2009 |
| JP | 2009-135103 A | 6/2009 |
| KR | 1020030045794 A | 6/2003 |
| KR | 1020080017113 A | 2/2008 |
| KR | 10-2008-0034219 A | 4/2008 |
| KR | 10-2009-0055307 | 6/2009 |
| KR | 1020090110133 A | 10/2009 |

OTHER PUBLICATIONS

European Office action issued by European Patent Office on Jan. 19, 2012, corresponding to EP 11181715.1-1227 attached herewith.

Kumeta, et al., Crosslinking Reaction of Poly(vinyl alcohol) with Poly(acrylic acid) (PAA) by Heat Treatment: Effect of Neutralization of PAA, Journal of Applied Polymer Science, vol. 90, pp. 2420-2427, 2003.

European Examination issued on Jun. 6, 2013 by the Examination Division of the European Patent Office in connection to the European Patent Application No. 11181715.1-1359 which claims Korean Patent Application No. KR10-2010-0092020 as its priority document.

The Japanese Office Action issued by the Japanese Patent Office dated Jun. 4, 2013 in connection to the Japanese Patent Application serial No. 2011-182240, which corresponds to the Korean Patent Application serial No. 10-2010-0092020 that cited and interpreted JP11-067215A, JP2004-134365A, JP2001-283859A, JP2009-135103A, JP2009-026760A, JP08-007896A, with Request for Entry of the Accompanying Office Action attached herewith.

SIPO Office Action issued on Oct. 25, 2013 in connection with Chinese Patent Application Serial No. 201110282165.9 as its priority document.

SIPO Office Action issued on Jul. 1, 2014 in connection with Chinese Patent Application Serial No. 201110282165.9 which also claims KR 10-2010-0092020 as its priority document, with its English translation.

Chinese Decision of Rejection issued by Chinese Patent Office on Jan. 21, 2015 in corresponding Chinese Patent Application No. 201110282165.9.

* cited by examiner

Mix together polyacrylic acid, polyvinyl alcohol, and hydroxide compound including alkali cation Produce a cross-linked compound of polyacrylic acid substituted with an alkali cation and cross-linked with polyvinyl alcohol

BINDER COMPOSITION FOR RECHARGEABLE LITHIUM BATTERY, AND ELECTRODE AND RECHARGEABLE LITHIUM BATTERY INCLUDING THE SAME

CLAIM OF PRIORITY

This application claims priority to and the benefit of Korean Patent Application No. 10-2010-0092020 filed in the Korean Intellectual Property Office on Sep. 17, 2010, the entire contents of which are incorporated herein by reference.

BACKGROUND OF THE INVENTION

1. Field of the Invention

This disclosure relates to a binder composition for a rechargeable lithium battery, and an electrode and a rechargeable lithium battery including the same.

2. Description of the Related Art

Lithium rechargeable batteries have recently drawn attention as a power source for small portable electronic devices. They use an organic electrolyte solution and thereby, have twice the discharge voltage than a conventional battery using an alkali aqueous solution, and accordingly, have high energy density.

The rechargeable lithium battery is fabricated by injecting electrolyte into an electrode assembly, which includes a positive electrode including a positive active material capable of intercalating/deintercalating lithium ions and a negative electrode including a negative active material capable of intercalating/deintercalating lithium ions.

For fabricating an electrode, a binder is required to provide adherence of the active material. A binder is also required for improving the cycle-life characteristics of a battery and for the stability of the electrode along with the high adherence.

SUMMARY OF THE INVENTION

One aspect of the present invention provides a binder composition for a rechargeable lithium battery being capable of improving the stability of an electrode and providing excellent cycle-life characteristics.

Another aspect of the present invention provides an electrode for a rechargeable lithium battery including the binder composition.

Yet another aspect of the present invention provides a rechargeable lithium battery including the binder composition.

According to one aspect of the present invention, a binder composition for a rechargeable lithium battery including a cross-linked compound of polyacrylic acid substituted with an alkali cation, and polyvinyl alcohol, is provided.

According to another aspect of the present invention, an electrode for a rechargeable lithium battery is provided that includes a current collector; and an active material layer disposed on the current collector. The active material layer includes an active material and a binder composition including a cross-linked compound of polyacrylic acid substituted with an alkali cation and polyvinyl alcohol.

According to yet another aspect of the present invention, a rechargeable lithium battery including a positive electrode, a negative electrode, and an electrolyte is provided.

The alkali cation may include $Li^+$, $Na^+$, $K^+$, $NH_4^+$, or a combination thereof.

The binder composition may have pH of about 4 to about 12.

The electrode may be a negative electrode and the active material may be a negative active material. The negative active material may include a Si-based compound such as Si, $SiO_x$ ($0<x<2$), Si-Q alloy (wherein Q is selected from an alkali metal, an alkaline-earth metal, a group 13 element, a group 14 element, a group 15 element, a group 16 element, a transition element, a rare earth element, or combinations thereof, and is not Si), a Si—C composite, or combinations thereof; a Sn-based compound such as Sn, $SnO_2$, a Sn-Q alloy (wherein Q is selected from an alkali metal, an alkaline-earth metal, a group 13 element, a group 14 element, a group 15 element, a group 16 element, a transition element, a rare earth element, or combinations thereof, and is not Sn), or combinations thereof.

The binder composition may have a cross-linking ratio of about 0.1% to about 70%.

The binder composition may have a viscosity range from about 1 Pa·s to about 100 Pa·s.

Hereinafter, further embodiments will be described in detail.

When the binder composition according to one embodiment is used for a rechargeable lithium battery, it may improve the stability of an electrode and provide excellent cycle-life characteristics for a battery.

DETAILED DESCRIPTION

Exemplary embodiments of the present invention will hereinafter be described in detail. However, these embodiments are only exemplary, and the present invention is not limited thereto.

The binder composition for a rechargeable lithium battery according to one embodiment includes a cross-linked compound of polyacrylic acid substituted with an alkali cation and polyvinyl alcohol.

The cross-linked compound of polyacrylic acid and polyvinyl alcohol is obtained by heating polyacrylic acid and polyvinyl alcohol to effect a cross-linking reaction via esterification.

According to one embodiment, the cross-linking compound uses a modified polyacrylic acid. The modified polyacrylic acid has a structure where one or more hydroxyl groups of the polyacrylic acid are substituted with an alkali cation.

The cross-linked compound of polyvinyl alcohol and polyacrylic acid substituted with an alkali cation may improve phase stability of a binder, and has high cross-linking ratio, thereby providing for excellent performance of a rechargeable lithium battery.

For example, the cross-linked compound according to one embodiment may be obtained by the following two methods.

Figure 4:
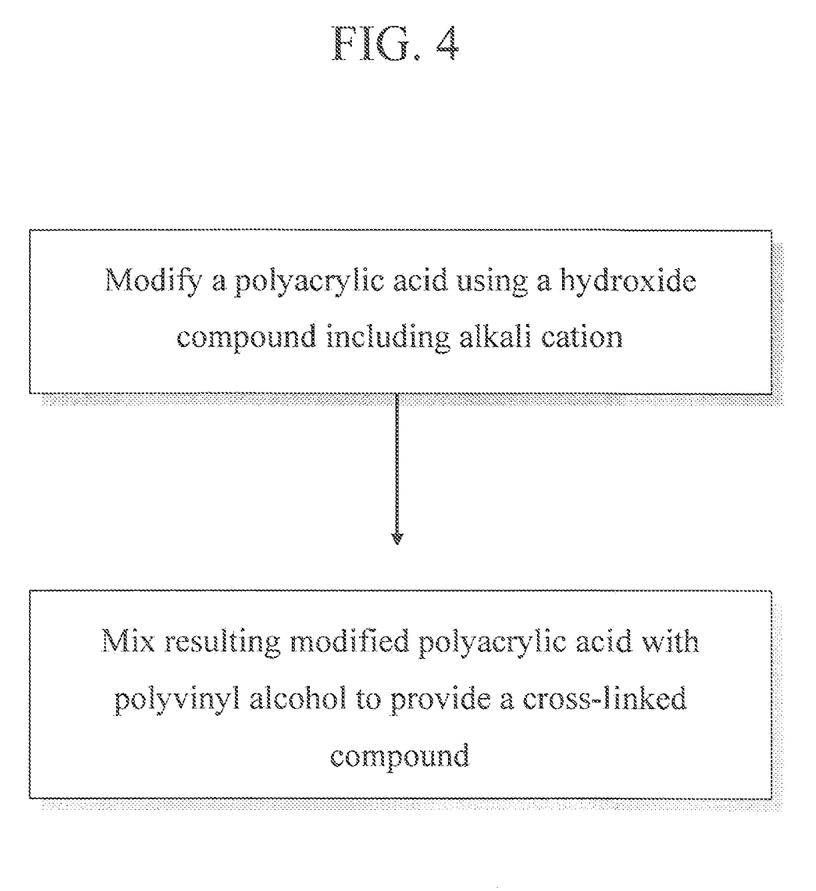
FIG. 4 is a flow chart showing the preparation of a cross-linked polyacrylic acid according to one embodiment of the invention.

According to the first method, polyacrylic acid is modified using a hydroxide compound including alkali cation and the resulting modified polyacrylic acid mixed with polyvinyl alcohol to provide a cross-linked compound of polyacrylic acid substituted with an alkali cation and polyvinyl alcohol, as shown in FIG. 4.

Figure 5:
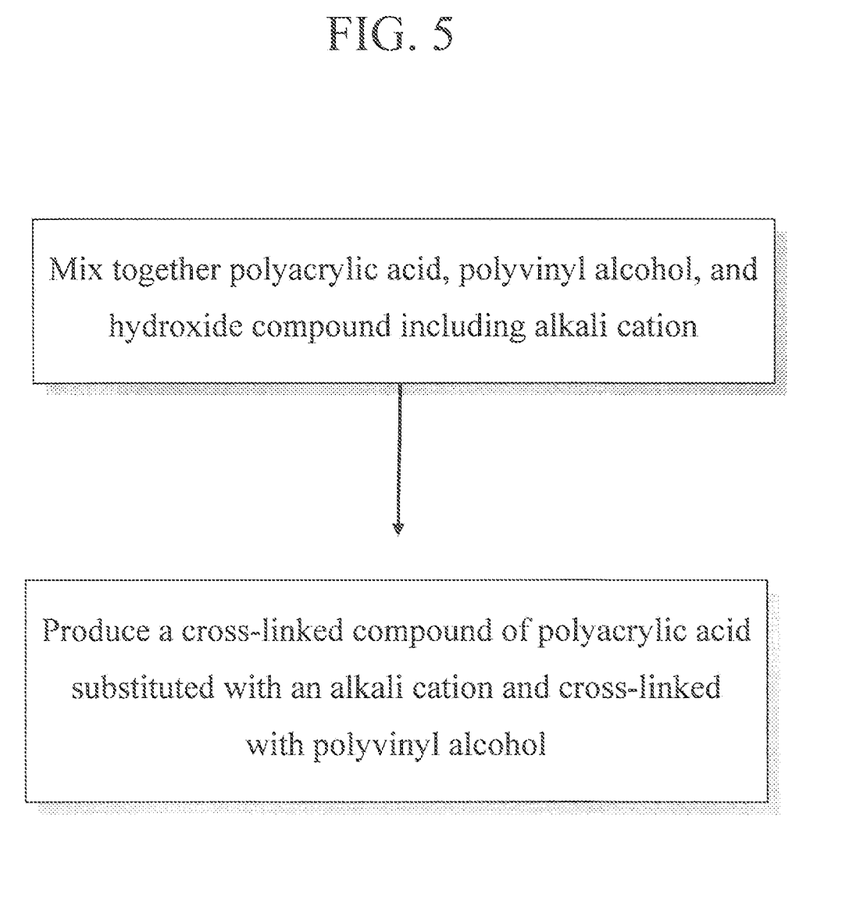
FIG. 5 shows the preparation of a cross-linked polyacrylic acid according an embodiment of the invention.

According to the second method, polyacrylic acid, polyvinyl alcohol, and hydroxide compound including alkali cation are mixed together to provide a cross-linked compound of polyacrylic acid substituted with an alkali cation and polyvinyl alcohol, as shown in FIG. 5.

According to the first and second methods, polyacrylic acid may be used in the form of an aqueous solution. The polyacrylic acid exhibits acidic properties having about pH 3.5 and low viscosity and is clear fluid when it is dissolved in water. The polyacrylic acid is present in a form of a coil in the aqueous solution. The hydroxide compound including alkali cation is added to the polyacrylic acid aqueous solution to increase pH, so that hydroxyl groups present in the polyacrylic acid are substituted with alkali cation. Thereby, polyacrylic acid present as a coil form becomes stretched.

In this case, the pH of a binder composition is increased depending upon the amount of hydroxide compound including alkali cation that is used, and thereby the viscosity of a binder composition is significantly increased.

The polyacrylic acid substituted with an alkali cation increases the ionization ratio to be more than that before modifying the polyacrylic acid. Thereby, it more easily performs the cross-linking reaction with polyvinyl alcohol to provide a cross-linked compound of polyacrylic acid substituted with an alkali cation and polyvinyl alcohol, so that the cross-linking ratio is increased.

The cross-linked compound may be obtained by heating the mixed solution to be cross-linked. The heat treatment may be performed at a temperature of about 150° C. to about 250° C., or for example, at about 180° C. to about 200° C. for about 30 minutes to about 180 minutes, or for example, for about 60 minutes to about 90 minutes. When the heat treatment is performed within the above temperature and time ranges, it may provide a cross-linked compound with a high cross-linking ratio.

The alkali cation may include $Li^+$, $Na^+$, $K^+$, $NH_4^+$, or a combination thereof.

The polyacrylic acid substituted with an alkali cation may have a substitution ratio with alkali cation of about 99% or less, for example, of about 80% to about 99%. When it has these substitution ratios, it may provide a cross-linked compound with a high cross-linking ratio.

The binder composition may have pH of about 4 to about 12, and specifically about 6 to about 8. When the binder composition has pH within these ranges, the viscosity of a binder composition is increased to improve the phase stability, thereby the cycle-life characteristics of a rechargeable lithium battery are improved.

The viscosity of binder composition may range from about 1 to about 100 Pa·s, for example, about 5 to about 8 Pa·s in the shearing rate of $1.0\ s^{-1}$. When the binder composition has the viscosity within the above ranges, the phase stability is improved, so that the cycle-life characteristics of a rechargeable lithium battery are improved.

The binder composition may have a cross-linking ratio ranging from about 0.1% to about 70%, for example, from about 15% to about 40% when it is cross-linked under the heating condition of about 200° C. and about 60 minutes. The cross-linking ratio may be measured and calculated through acid-base titration, it may be obtained by comparing the spectrum size to each functional group though IR analysis. When the cross-linking ratio is within the above ranges, the binding property of an electrode is increased, and the cycle-life characteristics of a rechargeable lithium battery are improved.

The binder composition may further include a water-soluble binder such as polyvinyl alcohol, carboxylmethyl cellulose, hydroxypropyl cellulose, a polymer including ethylene oxide, and the like, besides the cross-linking compound.

The binder composition may useful to prepare an electrode such as a positive electrode or a negative electrode. Preferably, the binder composition may used in order to prepare the negative electrode.

According to another embodiment, an electrode and rechargeable lithium battery including a binder composition is provided.

Rechargeable lithium batteries may be classified into lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, or coin-type batteries, and may be thin film batteries or may be rather bulky in size. Structures and fabrication methods for lithium ion batteries are well known in the art.

Figure 1:
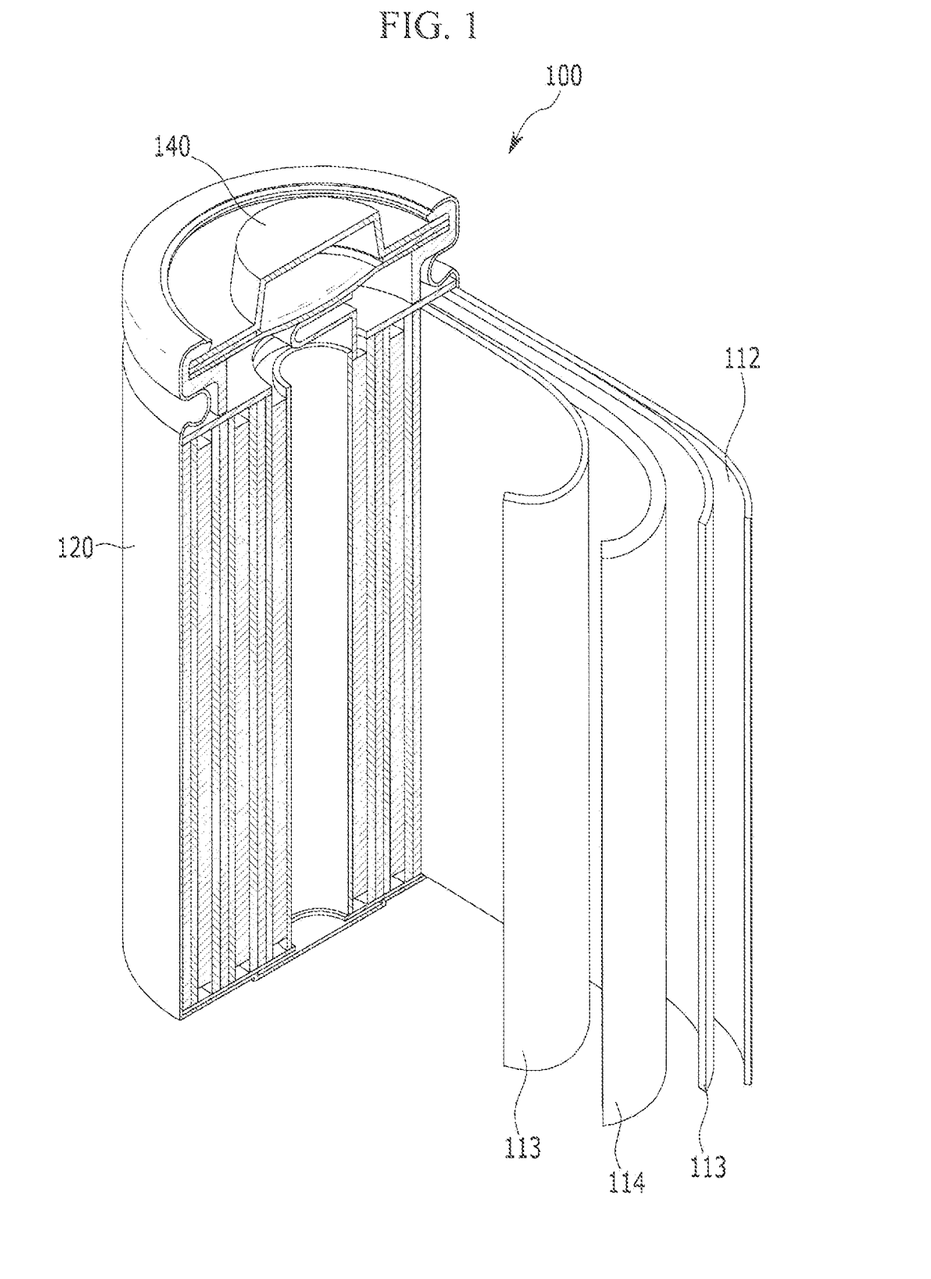
FIG. 1 is a schematic view of a rechargeable lithium battery according to one embodiment of the present invention.

FIG. 1 is a schematic view of a rechargeable lithium battery according to one embodiment of the present invention. As shown in FIG. 1, the rechargeable lithium battery 100 may be formed with a cylindrical shape and includes a negative electrode 112, a positive electrode 114, a separator 113 disposed between the negative electrode 112 and the positive electrode 114, an electrolyte (not shown) impregnated in the negative electrode 112, the positive electrode 114 and the separator 113, a battery case 120, and sealing member 140 sealing the battery case 120. The rechargeable lithium battery 100 is fabricated by sequentially stacking a negative electrode 112, a positive electrode 114, and separator 113, and spiral-winding them and housing the wound product in the battery case 120.

The negative electrode includes a current collector and a negative active material layer disposed on the current collector. The negative active material layer includes a negative active material and binder.

The current collector may be selected from the group consisting of a copper film, a nickel film, a stainless steel film, a titanium film, a nickel foam, a copper foam, a polymer substrate coated with a conductive metal, and combinations thereof.

The negative active material may include a material that may reversibly intercalate/deintercalate lithium ions, a lithium metal, a lithium metal alloy, a material doped and dedoped with lithium, a transition metal oxide, or combinations thereof.

The carbon material that may reversibly intercalate/deintercalate lithium ions may include any carbon-based negative active material generally used in a lithium ion secondary battery, for example, crystalline carbon, amorphous carbon, or a combination thereof. The crystalline carbon may include at least one of shapeless graphite, sheet-type graphite, flake-type graphite, spherical-shaped graphite or fiber-shaped natural graphite, artificial graphite, and mixtures thereof. The amorphous carbon may include soft carbon or hard carbon, mesophase pitch carbide, fired cokes, or mixtures thereof.

The lithium metal alloy may include a lithium alloy with a metal selected from the group consisting of Na, K, Rb, Cs, Fr, Be, Mg, Ca, Sr, Si, Sb, Pb, In, Zn, Ba, Ra, Ge, Al, and Sn.

The material doped and dedoped with lithium may include a Si-based compound such as Si, $SiO_x$ (0<x<2), Si-Q alloy (wherein Q is selected from an alkali metal, an alkaline-earth metal, a group 13 element, a group 14 element, a group 15 element, a group 16 element, a transition element, a rare earth element, or combinations thereof, and is not Si), a Si—C composite, or combinations thereof; a Sn-based compound such as Sn, $SnO_2$, a Sn-Q alloy (wherein Q is selected from an alkali metal, an alkaline-earth metal, a group 13 element, a group 14 element, a group 15 element, a group 16 element, a transition element, a rare earth element, or combinations thereof, and is not Sn), or combinations thereof. The element Q and R may be independently selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

The transition metal oxide may include vanadium oxide, lithium vanadium oxide, and the like.

The negative active material may include a Si-based compound such as Si, $SiO_x$ (0<x<2), Si-Q alloy (wherein Q is selected from an alkali metal, an alkaline-earth metal, a group 13 element, a group 14 element, a group 15 element, a group 16 element, a transition element, a rare earth element, or combinations thereof, and is not Si), a Si—C composite, or combinations thereof; a Sn-based compound such as Sn, $SnO_2$, a Sn-Q alloy (wherein Q is selected from an alkali metal, an alkaline-earth metal, a group 13 element, a group 14 element, a group 15 element, a group 16 element, a transition element, a rare earth element, or combinations thereof, and is not Sn), or combinations thereof.

When the Si-based compound or the Sn-based compound is used as a negative active material, the cycle-life characteristics of a rechargeable lithium battery may be deteriorated due to the repeated expansion and shrinkage of negative active material during the charge and discharge; on the other hand, the binder composition according to one embodiment may remarkably improve the cycle-life characteristics.

The binder may be the binder composition according to one embodiment may be preferable.

The negative active material layer may selectively include a conductive material.

The conductive material is included to improve electrode conductivity. Any electrically conductive material may be used as a conductive material unless it causes a chemical change. Examples of the conductive material include natural graphite, artificial graphite, carbon black, acetylene black, ketjen black, carbon fiber, a metal powder or a metal fiber including copper, nickel, aluminum, silver, and polyphenylene derivatives.

The positive electrode 114 includes a current collector and a positive active material layer disposed on the current collector. The positive active material layer includes a positive active material and a binder.

The current collector may be aluminum (Al) but is not limited thereto.

The positive active material includes a lithiated intercalation compound that reversibly intercalates and deintercalates lithium ions. The positive active material may include a composite oxide including at least one selected from the group consisting of cobalt, manganese, and nickel, as well as lithium. In particular, the following lithium-containing compounds may be used:

$Li_aA_{1-b}R_bD_2$ (0.90≤a≤1.8, 0≤b≤0.5); $Li_aE_{1-b}R_bO_{2-c}D_c$ (0.90≤a≤1.8, 0≤b≤0.5, and 0≤c≤0.05); $Li_aE_{2-b}R_bO_{4-c}D_c$ (0.90≤a≤1.8, 0≤b≤0.5 and 0≤c≤0.05); $Li_aNi_{1-b-c}Co_bR_cD_\alpha$ (0.90≤a≤1.8, 0≤b≤0.5, 0≤c≤0.05, and 0<α≤2); $Li_aNi_{1-b-c}Co_bR_cO_{2-\alpha}Z_\alpha$ (0.90≤a≤1.8, 0≤b≤0.5, 0≤c≤0.05, and 0<α<2); $Li_aNi_{1-b-c}Co_bR_cO_{2-\alpha}Z_2$ (0.90≤a≤1.8, 0≤b≤0.5, 0≤c≤0.05, and 0<α<2); $Li_aNi_{1-b-c}Mn_bR_cD_\alpha$ (0.90≤a≤1.8, 0≤b≤0.5, 0≤c≤0.05, and 0<α<2); $Li_aNi_{1-b-c}Mn_bR_cO_{2-\alpha}Z_\alpha$ (0.90≤a≤1.8, 0≤b≤0.5, 0≤c≤0.05, and 0<α<2); $Li_aNi_{1-b-c}Mn_bR_cO_{2-\alpha}Z_2$ (0.90≤a≤1.8, 0≤b≤0.5, 0≤c≤0.05, and 0<α<2); $Li_aNi_bE_cG_dO_2$ (0.90≤a≤1.8, 0≤b≤0.9, 0≤c≤0.5, and 0.001≤d≤0.1); $Li_aNi_bCo_cMn_dG_eO_2$ (0.90≤a≤1.8, 0≤b≤0.9, 0≤c≤0.5, 0≤d≤0.5, and 0.001≤e≤0.1); $Li_aNiG_bO_2$ (0.90≤a≤1.8, and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above formulae, A is selected from Ni, Co, Mn, and a combination thereof; R is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; Z is selected from F, S, P, and a combination thereof; G is selected from Al, Cr, Mn, Fe, Mg, La, Ce, Sr, V, and a combination thereof; Q is selected from Ti, Mo, Mn, and a combination thereof; T is selected from Cr, V, Fe, Sc, Y, and a combination thereof; and J is selected from V, Cr, Mn, Co, Ni, Cu, and a combination thereof.

The compound may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or mixtures thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the field.

The binder may include polyvinylidene fluoride (PVDF), polyimide, polyamideimide, polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The positive active material layer may selectively include conductive material.

The conductive material is included to improve electrode conductivity. Any electrically conductive material may be used as a conductive material unless it causes a chemical change. Examples of the conductive material include one or more of natural graphite, artificial graphite, carbon black, acetylene black, ketjen black, carbon fiber, a metal powder or a metal fiber including copper, nickel, aluminum, silver, and polyphenylene derivatives.

The negative 112 and positive electrodes 114 may be fabricated by a method including mixing the active material, a conductive material, and a binder in a solvent, into an active material composition and coating the composition on a current collector. The electrode manufacturing method is well known, and thus is not described in detail in the present specification. The solvent for the positive electrode may be N-methylpyrrolidone, but it is not limited thereto. The solvent for the negative electrode may be water, but is not limited thereto.

The electrolyte includes a lithium salt and a non-aqueous organic solvent.

The lithium salt is dissolved in an organic solvent and plays a role of supplying lithium ions in a battery, operating a basic operation of the rechargeable lithium battery, and improving lithium ion transportation between positive and negative electrodes therein.

Non-limiting examples of the lithium salt include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

When the carbonate-based solvent is prepared by mixing a cyclic carbonate and a linear carbonate, a solvent having a low viscosity while having an increased dielectric constant may be provided. The cyclic carbonate and the chain carbonate are mixed together in a volume ratio of about 1:1 to about 1:9.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. Examples of the ether-based solvent include dibutyl ether, tetraglyme, diglyme, dimethoxyethane, 2-methyltetrahydrofuran, tetrahydrofuran, or the like, and examples of the ketone-based solvent include cyclohexanone, or the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio may be controlled in accordance with a desirable battery performance.

The non-aqueous electrolyte may further include an overcharge-inhibiting additive such as ethylenecarbonate, pyrocarbonate, and the like.

Non-limiting examples of the separator 113 include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, the embodiments are illustrated in more detail with reference to examples. However, the following are exemplary embodiments and are not limiting.

Furthermore, what is not described in this specification can be sufficiently understood by those who have knowledge in this field and will not be illustrated here.

Preparation of Binder Composition

Example 1

18 wt % of a polyacrylic acid aqueous solution (10 wt % concentration), 8 wt % of NaOH, and 74 wt % of polyvinyl alcohol are mixed and heated at 200° C. for 60 minutes to provide a binder composition of cross-linked compound of $Na^+$-substituted polyacrylic acid and polyvinyl alcohol.

Example 2

20 wt % of a polyacrylic acid aqueous solution with a concentration of 10 wt %, 4 wt % of NaOH, and 76 wt % of polyvinyl alcohol are mixed and heated at 200° C. for 60 minutes to provide a binder composition of cross-linking compound of $Na^+$-substituted polyacrylic acid and polyvinyl alcohol.

Example 3

18 wt % of a polyacrylic acid aqueous solution with a concentration of 10 wt %, 10 wt % of NaOH, and 72 wt % of polyvinyl alcohol are mixed and heated at 200° C. for 60 minutes to provide a binder composition of cross-linking compound of $Na^+$-substituted polyacrylic acid and polyvinyl alcohol.

Comparative Example 1

20 wt % of a polyacrylic acid aqueous solution with a concentration of 10 wt %, and 80 wt % of polyvinyl alcohol are mixed and heated at 200° C. for 60 minutes to provide a binder composition of cross-linking compound of polyacrylic acid and polyvinyl alcohol.

Evaluation 1-1: pH Measurement of Binder Composition

Each binder composition obtained from Examples 1 to 3 and Comparative Example 1 is measured for pH using a pH meter, and the results are shown in the following Table 1.

Evaluation 1-2: Cross-Linking Ratio Measurement of Binder Composition

Each binder composition obtained from Examples 1 to 3 and Comparative Example 1 is measured and calculated for a cross-linking ratio through an acid-base titration, and the results are shown in the following Table 1.

Evaluation 1-3: Viscosity Measurement of Binder Composition

Each binder composition obtained from Examples 1 to 3 and Comparative Example 1 is measured for viscosity using a rheometer, and the results are shown in the following Table 1.

TABLE 1

| | Examples | | | Comparative Example 1 |
|---|---|---|---|---|
| | 1 | 2 | 3 | |
| pH | 6.3 | 4.8 | 11.9 | 3.4 |
| Cross-linking ratio (%) | 44 | 28 | 46 | 18 |
| Viscosity (Pa · s) | 5.78 | 4.50 | 10.23 | 2.42 |

As shown in Table 1, it is confirmed that Examples 1 to 3 including the cross-linking compounds of polyacrylic acid substituted with an alkali cation and polyvinyl alcohol have higher pH, cross-linking ratio, and viscosity compared to Comparative Example 1 including the cross-linking composition polyacrylic acid which is not substituted with alkali cation and polyvinyl alcohol.

In addition, it is confirmed that the viscosity is also increased along with increasing pH in Examples 1 to 3.

Evaluation 1-4: IR Data of Binder Composition

Figure 2:
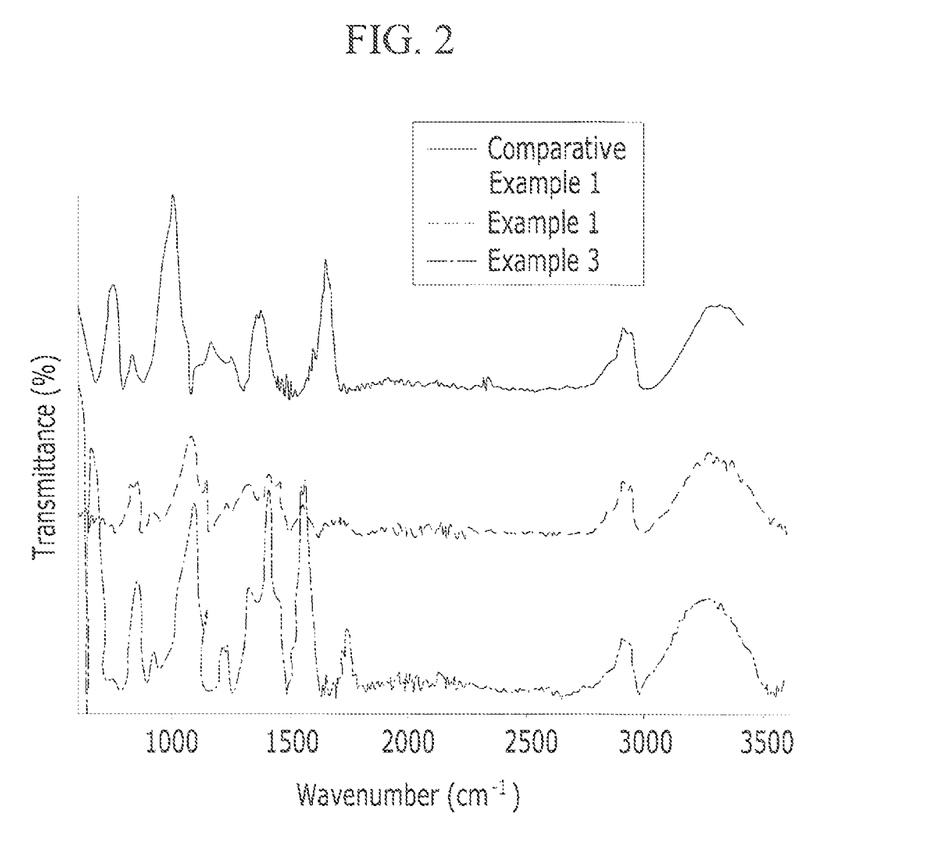
FIG. 2 is an IR spectrum of binder compositions obtained from Examples 1 and 3 and Comparative Example 1.

FIG. 2 shows an IR spectrum of binder compositions obtained from Examples 1 and 3 and Comparative Example 1.

Referring to FIG. 2, it is understood that Comparative Example 1 including a cross-linked compound of polyacrylic acid which is not substituted with alkali cation and polyvinyl alcohol shows a peak from carboxyl group of polyacrylic acid at around 1710 cm$^{-1}$, on the other hand, Examples 1 and 3 including the cross-linked compound of polyacrylic acid substituted with an alkali cation and polyvinyl alcohol according to one embodiment does not show the peak, or the peak is shifted to around 1600 cm$^{-1}$. From the results, it is understood that each binder composition obtained from Examples 1 and 3 is cross-linked.

<Fabrication of Rechargeable Lithium Battery Cell>

80 wt % of a negative active material of Si-based compound (manufactured by ShinEtsu, KSC1015) including silicon oxide and silicon alloy, 10 wt % of binder of each binder composition obtained from Examples 1 to 3 and Comparative Example 1, and 10 wt % of conductive material of carbon black are mixed and dispersed in water to provide a composition for a negative active material layer.

Subsequently, the composition for a negative active material layer is coated on a Cu-foil current collector to provide a negative electrode.

As a counter electrode of the negative electrode, lithium metal is used to provide a coin-type half-cell. An electrolyte is prepared by dissolving 1.3 M of LiPF$_6$ in a mixed solution of ethylene carbonate (EC) and dimethyl carbonate (DMC) in a volume ratio of 3:7.

Evaluation 2: Assessment of Cycle-Life Characteristic of Rechargeable Lithium Battery Cell Each rechargeable lithium battery obtained from Examples 1 to 3 and Comparative Example 1 is assessed for a cycle-life characteristic, and the results are shown in FIG. 3.

It is charged under the condition of constant current/constant voltage (CC/CV) mode of 0.02 C, 0.2 C, 0.5 C, and cut off of 0.01 C, respectively and discharged under the condition of constant current mode of 0.02 C, 0.2 C, 0.5 C, and cut off 1.4V, respectively.

Figure 3:
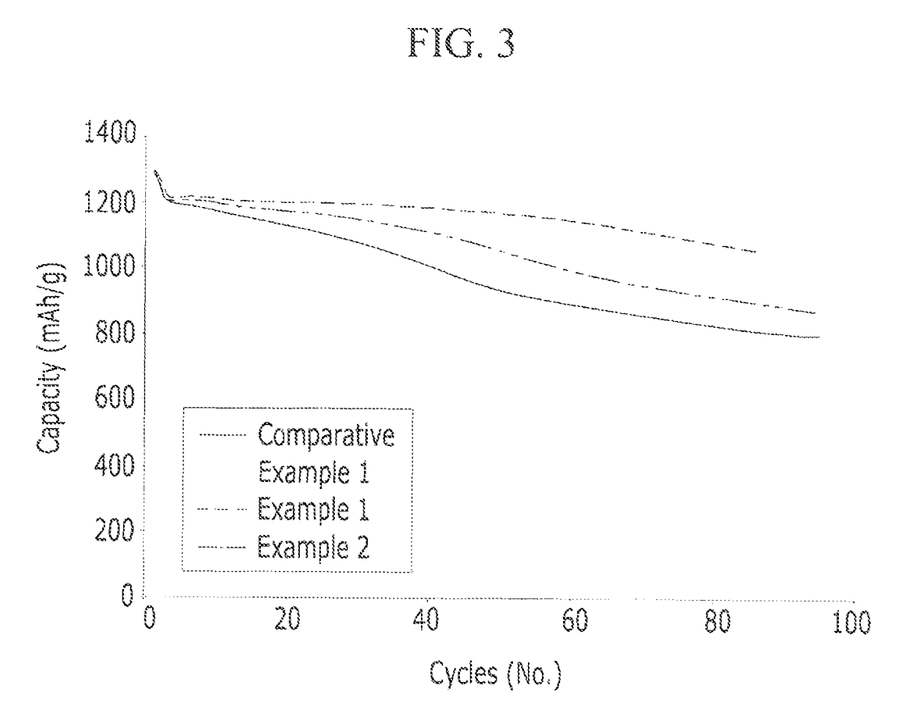
FIG. 3 is a graph showing a cycle-life characteristic of binder compositions obtained from Examples 1 and 2 and Comparative Example 1.

FIG. 3 is a graph showing a cycle-life characteristic of each rechargeable lithium battery obtained from Examples 1 and 2 and Comparative Example 1.

Referring to FIG. 3, it is confirmed that Examples 1 and 2 including a cross-linked compound of polyacrylic acid substituted with an alkali cation and polyvinyl alcohol have superior cycle-life characteristics to Comparative Example 1 including a cross-linking compound of polyacrylic acid which is not substituted with an alkali cation and polyvinyl alcohol.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A binder composition for a rechargeable lithium battery, comprising:
   a cross-linked compound of polyvinyl alcohol and polyacrylic acid, wherein the hydroxyl groups present in the polyacrylic acid are substituted with an alkali cation,
   the polyacrylic acid substituted with an alkali cation has a substitution ratio of about 80% to 99%;
   and wherein the cross-linked compound has a cross-linking ratio of about 28% to about 70%.

2. The binder composition for a rechargeable lithium battery of claim 1, wherein the alkali cation includes Li$^+$, Na$^+$, K$^+$, NH$_4^+$, or combinations thereof.

3. The binder composition for a rechargeable lithium battery of claim 1, wherein the binder composition has pH of about 4 to about 12.

4. The binder composition for a rechargeable lithium battery of claim 1, wherein the binder composition has a viscosity range from about 1 to about 100 Pa·s.

5. An electrode for a rechargeable lithium battery, comprising:
   a current collector; and
   an active material layer disposed on the current collector,
   wherein the active material layer comprises an active material; and a binder composition comprising:
   a cross-linked compound of polyvinyl alcohol and polyacrylic acid, wherein the hydroxyl groups present in the polyacrylic acid are substituted with an alkali cation,
   the polyacrylic acid substituted with an alkali cation has a substitution ratio of about 80% to 99%;
   and wherein the cross-linked compound has a cross-linking ratio of about 28% to about 70%.

6. The electrode for a rechargeable lithium battery of claim 5, wherein the alkali cation comprises Li$^+$, Na$^+$, K$^+$, NH$_4^+$, or a combination thereof.

7. The electrode for a rechargeable lithium battery of claim 5, wherein the electrode is a negative electrode, and the active material is a negative active material.

8. The electrode for a rechargeable lithium battery of claim 7, wherein the negative active material comprises:
   a Si-based compound selected from Si, SiOx (0<x<2), a Si-Q alloy (wherein Q is selected from an alkali metal, an alkaline-earth metal, a group 13 element, a group 14 element, a group 15 element, a group 16 element, a transition element, a rare earth element, or combinations thereof, and is not Si), a Si—C composite, or combinations thereof;
   a Sn-based compound selected from Sn, SnO$_2$, a Sn-Q alloy (wherein Q is selected from an alkali metal, an alkaline-earth metal, a group 13 element, a group 14 element, a group 15 element, a group 16 element, a transition element, a rare earth element, or combinations thereof, and is not Sn), or combinations thereof.

9. The electrode for a rechargeable lithium battery of claim 5, wherein the binder composition has pH of about 4 to about 12.

10. The electrode for a rechargeable lithium battery of claim 5, wherein the binder composition has a viscosity of about 1 to about 100 Pa·s.

11. A rechargeable lithium battery comprising
    a positive electrode;
    a negative electrode; and
    an electrolyte,
    wherein at least one of the positive electrode and the negative electrode comprises
    a current collector; and
    an active material layer disposed on the current collector, wherein the active material layer comprises an active material and a binder composition comprising:
a cross-linked compound of polyvinyl alcohol and polyacrylic acid, wherein the hydroxyl groups present in the polyacrylic acid are substituted with an alkali cation, the polyacrylic acid substituted with an alkali cation has a substitution ratio of about 80% to 99%;
and wherein the binder composition has a cross-linking ratio of about 28% to about 70%.

12. The rechargeable lithium battery of claim 11, wherein the alkali cation includes $Li^+$, $Na^+$, $K^+$, $NH_4^+$, or combinations thereof.

13. The rechargeable lithium battery of claim 11, wherein the electrode is a negative electrode, and the active material is a negative active material.

14. The rechargeable lithium battery of claim 13, the negative active material comprises:
a Si-based compound selected from Si, $SiO_x$ (0<x<2), a Si-Q alloy (wherein Q is selected from an alkali metal, an alkaline-earth metal, a group 13 element, a group 14 element, a group 15 element, a group 16 element, a transition element, a rare earth element, or combinations thereof, and is not Si), a Si—C composite, or combinations thereof;
a Sn-based compound selected from Sn, $SnO_2$, a Sn-Q alloy (wherein Q is selected from an alkali metal, an alkaline-earth metal, a group 13 element, a group 14 element, a group 15 element, a group 16 element, a transition element, a rare earth element, or combinations thereof, and is not Sn), or combinations thereof.

15. The rechargeable lithium battery of claim 11, wherein the binder composition has pH of about 4 to about 12.

16. The rechargeable lithium battery of claim 11, wherein the binder composition has a viscosity ranging from about 1 to about 100 Pa·s.

* * * * *